2,944,033

EXCHANGE RESINS FROM N-HALOGENATED COPOLYMERS

Solomon Goodman, 421 W. 25th St., New York, N.Y.

No Drawing. Filed June 25, 1956, Ser. No. 593,334

4 Claims. (Cl. 260—2.1)

The present invention relates to exchange resins and it particularly relates to exchange resins which are useful for the introduction of halogen atoms into various chemical compositions, and for the oxidation of various chemical compositions.

It is among one object of the present invention to provide certain novel exchange resins which will permit introduction of a halogen atom into a composition being contacted therewith until exhaustion followed by regeneration by the resin so that it may again be reacted with additional material to continue the exchange and insertion of the halogen therein and which will effect an oxidation of a composition being contacted therewith by virtue of the supplying by the resin of positive halogen.

Another object of the present invention is to provide a novel exchange resinous material which, although insoluble in reacting fluids, will nevertheless transfer thereinto positive halogen until exhaustion following which there may be ready regeneration.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has now been found that certain types of complex high molecular weight nitrogen halogen combinations associated with amides or imides will form exchange resins which will have available an exchangeable positive halogen.

It has been found that highly polymerized amides and imides may be treated with chlorine or bromine or hypochlorite salts or mixtures of bromine and bromide salts which will give insoluble resins useful as sources of positive halogen in chemical reactions.

For example, polymeric materials produced by polymerization of styrene followed by treatment with chlorosulfonic acid and then by ammonia and then by chlorine have such exchange properties.

It has been found that the most active exchange resins of the character described are those which contain nitrogen in combination in the resinous mass groups in which the nitrogen carries a bromine or chlorine.

The resins of the present invention may be used in a similar manner to acid or base ion exchange resins in which the exchange resin is placed in a column and the reactant liquid is passed therethrough until the halogen has been exhausted, and after the positive halogen has been exhausted the resin may be regenerated by passing chlorine, bromine or combinations thereof through the column.

These resins when initially prepared or regenerated provide a reservoir of positive halogen which may be released at a slow or controllable rate either for halogenating or oxidizing reactions.

In a typical method of preparation, a resinous copolymer of unsaturated hydrocarbon ingredients is formed in the presence of amino compounds so that the resin will contain a large number of cross linked amido or imido bonds.

The resultant resinous material may then be placed in condition for exchange purposes and subjected to treatment with bromine, chlorine or hypochlorite or hypobromite, preferably in aqueous solution.

The resins of this invention have certain structural characteristics in the molecular structure:

(a) They are cross linked or highly branched and hence insoluble in all chemicals which do not degrade or decompose them;

(b) They contain N-chloro or N-bromo groups where the nitrogen is part of a sulfonamide group, a sulfonimide group, a succinimide group, a phthalimide group, a carbo-sulfonimide group, or other imide or amide groups such as hydantoin or phosphamide group;

(c) They contain no structures which are susceptible to attack by the N-chloro or N-bromo group at pH greater than 7.

Some examples of the reactions of the resins of this invention with various chemical compounds are:

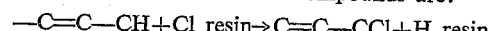
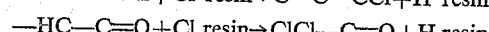
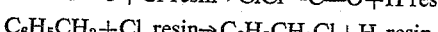
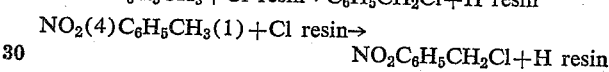

The following examples serve to illustrate some of the various types of resins of this invention, but they are not intended to unduly limit the broad scope of the invention.

Example I 100 parts by weight of a copolymer of styrene and maleic anhydride with a solution of 35 parts of ammonia and 6 parts of ethylene diamine in a mixture of water and dioxane.

The solvents, water and excess ammonia are evaporated off, and the resin converted to a cross-linked polyimide by heating to 250° C. until no more water and ammonia are evolved.

The resin is then crushed to a granulated state and reacted with a 5% solution of sodium hypochlorite with continuous addition of acetic acid to keep the pH of the solution between 8 and 10. During this time the slurry is agitated and cooled to keep the temperature below 25° C.

About 70 grams of sodium hypochlorite are consumed, but an excess is used. The product is washed with water.

Water treated with this resin is shown to contain positive chlorine by the starch-iodide test.

The resins may be placed in a column and the reactant liquid passed through it. The positive halogen has been exhausted by various reactive or reducing compounds.

The resin may be regenerated in the column and used over again. The resin provides a reservoir of positive halogen which is released at a slow and controllable rate.

Example II

A copolymer of methyl vinyl ether and maleic anhydride in the form of the ammonium salt of the half amide (190 parts by weight) was treated with a solution of 7 parts of ethylene diamine in 500 parts of isopropanol.

The solvent and some ammonia was evaporated off at 100° C. The temperature of the resin was raised to 250° C. until the evolution of water and ammonia ceased.

The yellow infusible solid, weighing about 180 parts was suspended in 700 parts of water containing 36 parts of sodium hydroxide.

The suspension was stirred and cooled during the addition of 144 parts of bromine, while the temperature was kept below 10° C. The resin was filtered off and washed with water.

The resin was useful in halogen ion exchange reactions and the exhausted resin is easily recovered quantitatively and reactivated.

*Example III*

A polystyrene with a molecular weight of about 40,000 is dissolved in a non-reactive solvent and added to an excess of chlorosulfonic acid with agitation and cooling.

Ice is added to destroy the excess chlorosulfonic acid and to dilute the sulfuric acid.

The organic slurry is washed with ice water to remove excess acid and then added to cooled, well stirred 20% aqueous ammonia solution containing excess ammonia.

After the reaction is over, the resin is filtered off, washed with water and freed of solvent. It is then charged with positive halogen by chlorine water or bromine water or aqueous solutions of the hypobromite or hypochlorite.

*Example IV*

Aniline hydrochloride is suspended in hexane and chlorosulfonic acid is added slowly with vigorous agitation and cooling until there has been added 2.1 mols of acid per mol of aniline.

The temperature is allowed to rise slowly until the solvent is refluxing.

The mixture is then heated to refluxing and maintained there until the evolution of HCl ceases. The organic material is separated and washed with ice water.

An aqueous solution of sodium hydroxide containing 1.5 mols of sodium hydroxide per mol of aniline is added with cooling and agitation.

The resin is filtered off, washed with water and charged with positive halogen.

*Example V*

A polymer or copolymer of an aliphatic diene, such as butadiene, is dissolved in a suitable solvent such as hexane and treated with an excess of sulfuryl chloride in the presence of a catalyst to produce a cross linked resin containing a plurality of sulfonyl chloride groups.

This resin is then converted to a polysulfonamide by treatment with ammonia or another primary amine.

The polysulfonamide is then charged with positive halogen.

*Example VI*

A mixture of one mol of an aliphatic diamine, containing more than three carbon atoms between primary amino groups, an aqueous solution containing two mols of sodium hydroxide, and an inert organic liquid, such as carbon tetrachloride, is agitated and cooled while 1.1 mol of sulfuryl chloride dissolved in carbon tetrachloride is added.

The product, a linear polysulfamide, is cross linked as by reaction with .1 mol of formaldehyde, washed with water and charged with positive chlorine or bromine.

*Example VII*

A polymeric amine is obtained by the hydrogenation of a polymer or suitable copolymer of acrylonitrile.

Treatment of this polyamine with a suitable sulfonyl chloride in the presence of alkali converts it to a polysulfonamide.

This may be rendered insoluble by cross linking and then charged with positive halogen.

*Example VIII*

Diallyl ketone is converted to 5.5 diallyl hydantoin by reaction with ammonium carbonate and sodium cyanide. The diallyl hydantoin is polymerized or copolymerized with a comonomer to an insoluble resin.

It is charged with positive halogen.

*Example IX*

An unsaturated sulfonamide such as N-allyl benzene sulfonamide or N-vinyl benzene sulfonamide is polymerized or copolymerized with a comonomer. The polymer is rendered insoluble as by cross linking and charged with positive halogen.

The polymeric insoluble resins in the present application when exhausted may be regenerated most satisfactorily by treatment by aqueous solutions of sodium hydrochlorite and they are very effective in providing, when regenerated, positive halogen for halogenation or oxidation reactions from their N-halo amides or imides.

The resins of the present application may be used in lieu of N-bromo-succinimide, N-chloro-paratoluene sulfonamide, and 1,3-dichloro- 5,5-dimethyl hydantoin, in halogenation and oxidation reactions without contributing undesirable soluble organic compounds to the solutions or materials being processed.

For example, the resins may be used directly for the treatment of drinking water to chlorinate the same or to kill bacteria therein without contributing any undesirable organic materials to such drinking water.

The resins of the present application are suitable for reaction with either liquid or gaseous systems.

It has been found that water may be freed of live microorganisms by passing it through a column of granulated resin containing positive halogen.

It has been found that air containing noxious odors may be freed of the noxious odors by passing it through a container containing loosely packed granules of resin containing positive halogen.

The resins of this invention are useful in treating infections or in keeping wounds from getting infected since they are directly applicable thereto and since they act as a reservoir of positive halogen while maintaining only a low concentration of positive halogen, and at the same time not producing extraneous soluble material which may interfere with healing.

It has been found that the resins of this invention may be incorporated, in a finely ground condition, into the soil in which plants are growing to effect a sterilization of the soil without interfering with the growth of the plants. The positive halogen of the resin is soon exhausted so that beneficial micro-organisms may become established within a short time after treatment.

The resins of this invention may be useful in protecting against or decontaminating certain poisonous substances such as mustard gas which are susceptible to oxidation by this relatively vigorous oxidizing agent.

The resins of this invention may be useful in bleaching solutions where the bleaching action of hypochlorite is desired but where it is desirable to avoid the contamination of extraneous ions.

The resins of this invention are useful in various chemical reactions for halogenating or oxidizing action. They may be added directly to aqueous or non-aqueous reaction mixtures and they may be recovered later by filtration, or the reaction mixture may be passed through a column of the resin.

In making resins of the above type, the basic reactions may be as follows: formation of a polymer by addition or condensation polymerization and successive treatment of the polymer by chlorosulfonating agents, amines, and, finally, halogen or hypohalite, for example:

monomers→polymer→resin—SO₂Cl→resin
—SO₂NHR→Resin—SO₂NClR

One preferred method consists of treating a copolymer of styrene and maleic anhydride with aqueous ammonia to produce the half amide of the copolymer of styrene and maleic acid.

Then, ethylene diamine is combined in small amount for cross linking purposes following which the compound is heated to drive off water and excess ammonia to form the polyimide groups. The resin is then chlorinated with sodium hypochlorite or chlorine in the presence of a sodium bicarbonate solution.

The sodium bicarbonate acts as a buffer and assures that the resin will be treated with chlorine or bromine at the proper pH to result in the production of positive chlorine.

A typical exchange resin formula according to the present invention is the following:

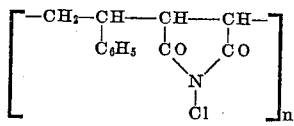

This compound is produced by the following series of steps:

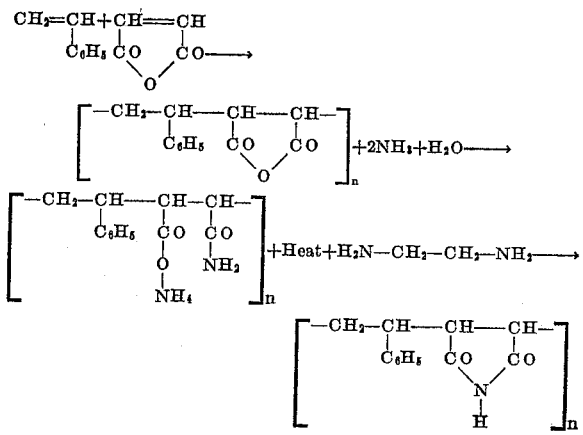

By chlorinating, it is possible to convert the —NH— group into a —NCl— group.

When using styrene, the polystyrene is treated with chlorosulfonic acid and with ammonia and then chlorinated to produce the resin.

With aniline, the aniline may be condensed with sulfuryl chloride or chlorosulfonic acid and then charged with positive halogen.

Having now particularly described and ascertained the nature of the invention, and in what matter the same is to be performed, what is claimed is:

1. Insoluble complex, high molecular weight, polymeric exchange resins having exchangeable positive chlorine atoms and consisting basically of a high molecular weight copolymer of styrene and maleic anhydride containing N-halogen amide groups, said copolymer being cross-linked with diamines through carboxyl and having the N atoms of the diamines n-chlorinated.

2. Insoluble complex high molecular weight, polymeric exchange resins having exchangeable positive chlorine atoms and consisting basically of a high molecular weight copolymer of styrene and maleic anhydride containing N-chloro succinimide groups, said copolymer being cross-linked with diamines through carboxyl and having the N atoms of the diamines n-chlorinated.

3. Insoluble complex, high molecular weight, polymeric exchange resins having exchangeable positive chlorine atoms and consisting basically of a high molecular weight copolymer of styrene and maleic anhydride containing N-halogen succinimide groups, said copolymer being cross-linked with diamines through carboxyl and having the N atoms of the diamines n-chlorinated.

4. A process of making an N-chloro succinimide complex, high molecular weight base exchange resin, having exchangeable positive chlorine atoms and consisting basically of a high molecular weight copolymer of styrene and maleic anhydride which comprises combining 100 parts by weight of a copolymer of styrene and maleic anhydride with a solution of 35 parts of ammonia and 6 parts of ethylene diamine in a mixture of water and dioxane, evaporating off the solvents, water and excess ammonia by heating to 250° C. to produce a resin, crushing the resin to a granulated state and reacting with a 5 percent solution of sodium hypochlorite whilst adding acetic acid to maintain the pH of 8 to 10 and cooling to below 25° C.

References Cited in the file of this patent
UNITED STATES PATENTS

| | | |
|---|---|---|
| 2,260,367 | Dubeau | Oct. 28, 1941 |
| 2,276,030 | Dubeau | Mar. 10, 1942 |
| 2,313,565 | McDowell | Mar. 9, 1943 |
| 2,472,361 | Arsem | June 7, 1949 |
| 2,750,358 | Park | June 12, 1956 |

OTHER REFERENCES

Hickenbottom: Reactions of Organic Compounds, 2nd ed., pages 252–253, Longmans, Green & Co., 1950.